United States Patent
Kawano et al.

(10) Patent No.: US 9,064,397 B2
(45) Date of Patent: Jun. 23, 2015

(54) STATE ESTIMATION DEVICE, STATE ESTIMATION METHOD, AND PROGRAM

(75) Inventors: Takashi Kawano, Obu (JP); Koji Oguri, Handa (JP); Akihiro Imai, Ichinomiya (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/002,619

(22) PCT Filed: Mar. 2, 2012

(86) PCT No.: PCT/JP2012/055462
§ 371 (c)(1),
(2), (4) Date: Aug. 30, 2013

(87) PCT Pub. No.: WO2012/118206
PCT Pub. Date: Sep. 7, 2012

(65) Prior Publication Data
US 2013/0335228 A1    Dec. 19, 2013

(30) Foreign Application Priority Data

Mar. 3, 2011    (JP) ................................. 2011-047028

(51) Int. Cl.
*G08B 23/00* (2006.01)
*G08B 21/06* (2006.01)
*G08G 1/16* (2006.01)
(Continued)

(52) U.S. Cl.
CPC ... *G08B 21/06* (2013.01); *G08G 1/16* (2013.01); *G06K 9/00845* (2013.01); *G06K 9/6292* (2013.01); *G06K 9/628* (2013.01)

(58) Field of Classification Search
CPC ..... G08G 1/16; G08B 21/06; G06K 9/00845; G06K 9/6292; G06K 9/03
USPC ............ 340/573.1, 573.7, 575, 576; 382/103, 382/117, 118
See application file for complete search history.

(56) References Cited

U.S. PATENT DOCUMENTS 5,878,156 A * 3/1999 Okumura ....................... 382/118
6,571,002 B1 * 5/2003 Ogawa ........................... 382/117
(Continued)

FOREIGN PATENT DOCUMENTS

EP    2 453 427 A1    5/2012
JP    2004-192551 A    7/2004
(Continued)

OTHER PUBLICATIONS

International Search Report of PCT/JP2012/055462, dated Apr. 17, 2012.
(Continued)

*Primary Examiner* — Anh V La
(74) *Attorney, Agent, or Firm* — Sughrue Mion, PLLC (57) ABSTRACT

A verification value is calculated for an estimation result. The estimation result is corrected on the basis of the calculated verification value. This allows for output of a highly reliable estimation result. If it is determined that the class to which the state of a driver belongs has transitioned continuously, the estimation result is outputted. If it cannot be determined that the class to which the state of the driver belongs has transitioned continuously, a previous estimation result is outputted instead of the latest estimation result. This allows for output of a highly reliable estimation result.

8 Claims, 6 Drawing Sheets

(51) Int. Cl.
  *G06K 9/00* (2006.01)
  *G06K 9/62* (2006.01)

(56) References Cited

U.S. PATENT DOCUMENTS

| | | |
|---|---|---|
| 8,094,883 B2 | 1/2012 | Nagai et al. |
| 2006/0210121 A1* | 9/2006 | Nakano et al. ................ 382/117 |
| 2010/0073497 A1 | 3/2010 | Katsumata et al. |
| 2012/0105234 A1 | 5/2012 | Oguri et al. |

FOREIGN PATENT DOCUMENTS

| | | |
|---|---|---|
| JP | 2004-199386 A | 7/2004 |
| JP | 2009-90028 A | 4/2009 |
| JP | 2009-301367 A | 12/2009 |
| JP | 2010-74735 A | 4/2010 |
| WO | 2011/004641 A1 | 1/2011 |

OTHER PUBLICATIONS

Extended European Search Report, dated Jul. 21, 2014, issued in counterpart European Patent Application No. 12751797.7.

* cited by examiner

|  | CLASS1 | CLASS2 | CLASS3 | CLASS4 | クラス5 |
|---|---|---|---|---|---|
| FIRST GROUP | ○ | ○ | ○ | — | — |
| SECOND GRUOP | — | — | — | ○ | ○ |
| THIRD GROUP | ○ | ○ | ○ | ○ | — |
| FOURTH GROUP | — | — | — | — | ○ |

STATE ESTIMATION DEVICE, STATE ESTIMATION METHOD, AND PROGRAM

CROSS REFERENCE TO RELATED APPLICATIONS

This application is a National Stage of International Application No. PCT/JP2012/055462 filed Mar. 2, 2012, claiming priority based on Japanese Patent Application No. 2011-047028, filed Mar. 3, 2011, the contents of all of which are incorporated herein by reference in their entirety.

TECHNICAL FIELD

The present invention relates to a state estimation device, a state estimation method and a program, more specifically relating to a state estimation device to estimate the state of a driver, as well as a state estimation method and a program to estimate the state of a driver.

BACKGROUND ART

Although the number of deaths resulting from traffic accidents has been decreasing recently, the number of traffic accidents still remains high. Traffic accidents are attributed to various causes, and one of the causes to trigger traffic accidents is that of a driver driving a vehicle in a careless state. The careless state can be roughly divided into a state in which the driver becomes inattentive to driving by his performing an act other than driving, such as carrying on a conversation and using a mobile phone and a state in which the driver decreases his attention due to fatigue and sleepiness.

It is difficult for a driver himself/herself to prevent fatigue and sleepiness. Therefore, various systems have been proposed for accurately detecting a drowsy of driver or a decrease in wakefulness of a driver, from the standpoint of safety (see, for example, Patent Literatures 1 and 2).

An estimation device described in Patent Literature 1 estimates whether a driver is in a careless state in which the driver's attention has decreased, on the basis of output from an identification device in which input is biological information of the driver and information on the vehicle the driver drives. Specifically, the estimation device performs weighting on the basis of reliabilities of output results, and estimates, as the state of the driver, a result indicated by the majority of the output results from the identification device.

A device described in Patent Literature 2 estimates the degree of sleepiness a driver feels on the basis of, for example, a plurality of feature amounts of information about the driver's eyes, such as time required for a blink and the degree of opening of the eyes.

CITATION LIST

Patent Literature

PTL 1: Unexamined Japanese Patent Application Kokai Publication No. 2009-301367
PTL 2: Unexamined Japanese Patent Application Kokai Publication No. 2009-90028

SUMMARY OF INVENTION

Technical Problem

The device described in Patent Literature 1 estimates the state of a driver on the basis of output from the identification device. Therefore, the device determines only whether the driver is in a careless state or not, but has difficulty in estimating the state of the driver at multiple levels.

The estimation device described in Patent Literature 2 is able to estimate the state of a driver at multiple levels. However, the state of the driver usually transitions continuously. Therefore, it is considered rare that a state in which wakefulness is high transitions to a state in which wakefulness is extremely low in a short period of time, or a state in which wakefulness is extremely low transitions to a state in which wakefulness is high in a short period of time. Accordingly, in order to accurately estimate the state of the driver, continuity of transition of the state needs to be taken into consideration.

The present invention was made in view of the above circumstances, and has an objective of accurately estimating the state of a driver, taking it into consideration that the state of the driver continuously transitions.

Solution to Problem

In order to achieve the above objective, a state estimation device according to a first aspect of the present invention estimates the state of the driver, and includes:

first identification means to identify, of a first group and a second group, the group to which the state of the driver belongs using a feature amount about the driver as an input value, each of the first group and the second group having a plurality of classes defined as based on a degree of the activity of the driver;

second identification means to identify, of a third group and a fourth group, the group to which the state of the driver belongs using a feature amount about the driver as an input value, each of the third group and the fourth group having a plurality of classes defined as based on a degree of the activity of the driver;

estimation means to estimate the class to which the state of the driver belongs, on the basis of the identification result of the first identification means and the identification result of the second identification means;

verification means to verify an estimation result of the estimation means; and output means to output an estimation result that corresponds to a verification result of the verification means.

In order to achieve the above objective, a state estimation method according to a second aspect of the present invention estimates the state of the driver, and includes:

a first identification step to identify, of a first group and a second group, the group to which the state of the driver belongs using a feature amount about the driver as an input value, each of the first group and the second group having a plurality of classes defined as based on a degree of the activity of the driver;

a second identification step to identify, of a third group and a fourth group, the group to which the state of the driver belongs using a feature amount about the driver as an input value, each of the third group and the fourth group having a plurality of classes defined as based on a degree of the activity of the driver;

an estimation step to estimate the class to which the state of the driver belongs, on the basis of the identification result of the first identification step and the identification result of the second identification step;

a verification step to verify the result of the estimation; and an output step to output an estimation result corresponding to the result of the verification.

In order to achieve the above objective, a program according to a third aspect of the present invention causes the computer to perform:

a first procedure to identify, of a first group and a second group, the group to which the state of the driver belongs using a feature amount about the driver as an input value, each of the first group and the second group having a plurality of classes defined as based on a degree of the activity of the driver;

a second identification procedure to identify, of a third group and a fourth group, the group to which the state of the driver belongs using a feature amount about the driver as an input value, each of the third group and the fourth group having a plurality of classes defined as based on a degree of the activity of the driver;

an estimation procedure to estimate the class to which the state of the driver belongs, on the basis of the identification result of the first identification procedure and the identification result of the second identification procedure;

a verification procedure to verify the result of the estimation; and an output procedure to output an estimation result corresponding to the result of the verification.

Advantageous Effects of Invention

According to the present invention, an estimation result estimated on the basis of an identification result is verified. Accordingly, in performing verification, it is possible to accurately estimate the state of a driver by verifying, for example, continuity of transition of the state of the driver.

DESCRIPTION OF EMBODIMENTS

First Embodiment

Figure 1:
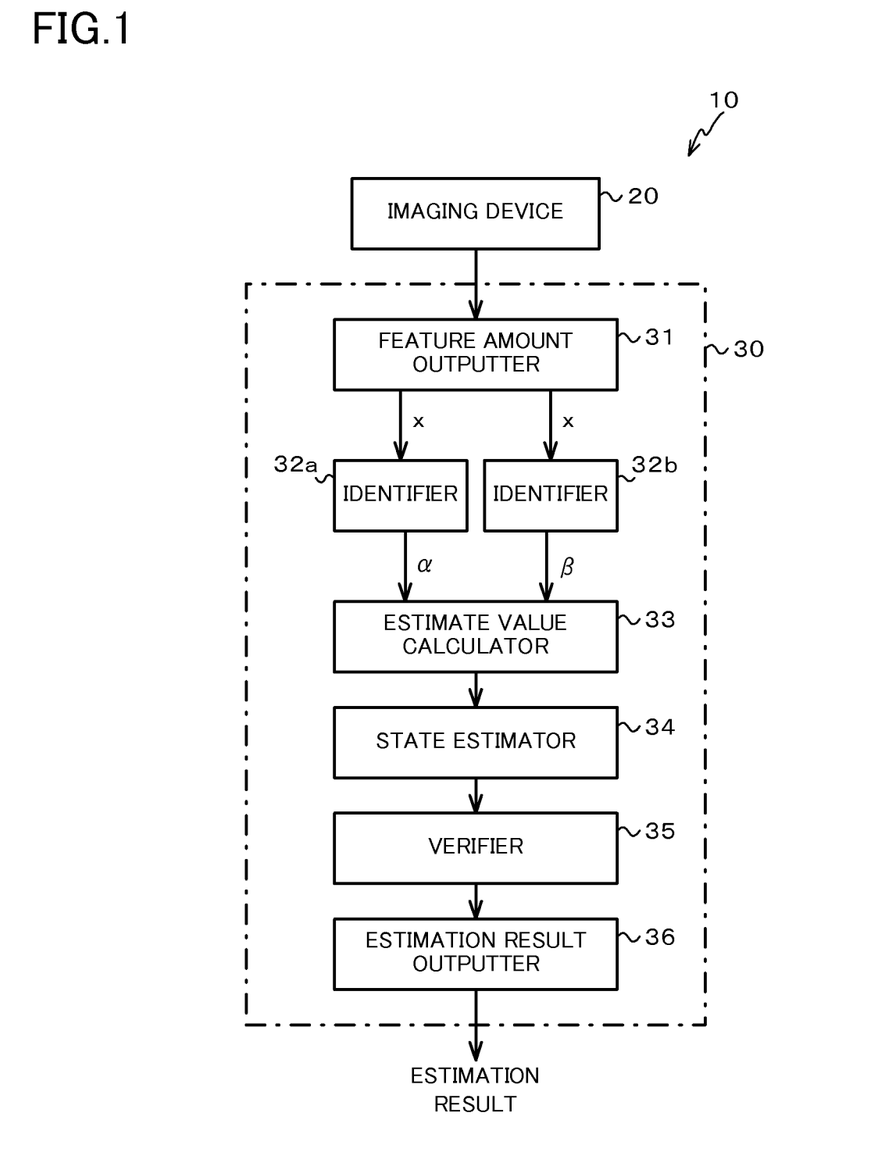
FIG. 1 is a block diagram illustrating a state estimation system according to a first embodiment.

Hereinafter, a first embodiment of the present invention will be described with reference to drawings. FIG. 1 is a block diagram illustrating a schematic configuration of a state estimation system 10 according to the present embodiment. The state estimation system 10 estimates the state of a driver who drives a car on the basis of, for example, biological information of the driver. This estimates whether the driver is in a state to trigger a traffic accident due to sleepiness and/or fatigue.

In the present embodiment, the state of a driver is specified such that a state in which the driver does not look sleepy at all is class 1, a state in which the driver looks a little sleepy is class 2, a state in which the driver looks sleepy is class 3, a state in which the driver looks quite sleepy is class 4, and a state in which the driver looks very sleepy is class 5 according to the definition by New Energy and Industrial Technology Development Organization (NEDO), and it is estimated to which class the state of the driver 60 belongs.

As illustrated in FIG. 1, the state estimation system 10 has an imaging device 20 and an estimation device 30.

Figure 2:
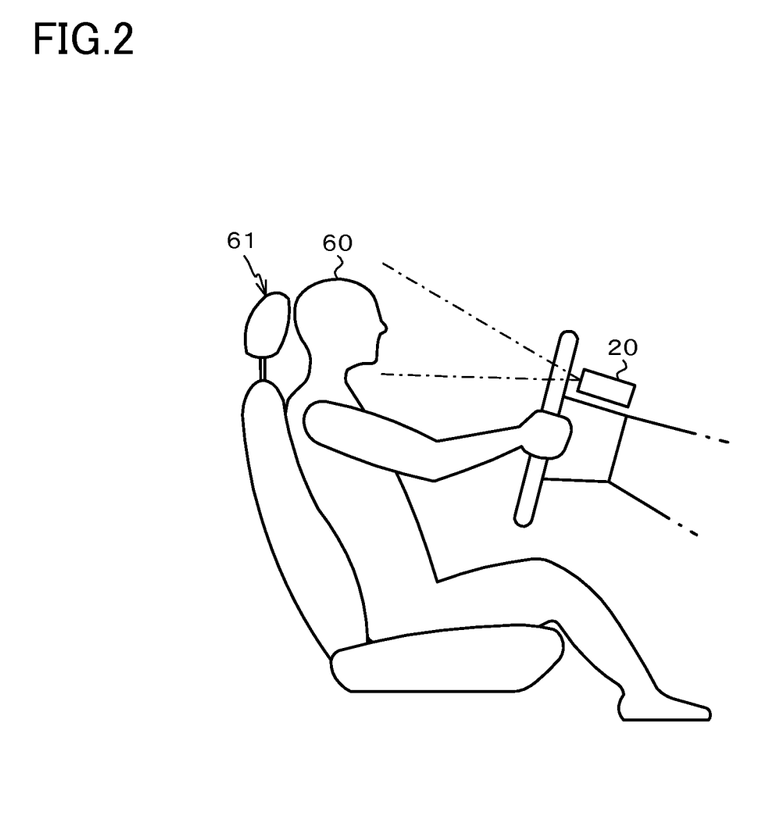
FIG. 2 is a diagram illustrating arrangement of an imaging device.

The imaging device 20 photographs the face of the driver 60 sitting on a seat 61, converts an image obtained by photographing to an electric signal, and outputs the electric signal to the estimation device 30. The imaging device 20 is disposed on, for example, a steering wheel column, as illustrated in FIG. 2. The view angle and posture of the imaging device 20 are adjusted so that the face of the driver 60 is positioned in the center of the field of view.

The estimation device 30 has a feature amount outputter 31, identifiers 32a, 32b, an estimate value calculator 33, a state estimator 34, a verifier 35 and an estimation result outputter 36, as illustrated in FIG. 1.

The feature amount outputter 31 extracts biological information of the driver 60 as a feature amount from image information outputted from the imaging device 20, for example, every 10 seconds, and then outputs the extracted feature amount to the identifiers 32a, 32b. Specifically, the feature amount outputter 31 extracts biological information such as the degree a1 of opening of eyelids of the driver 60, the number a2 of blinks per unit time, the time a3 required from start of a blink to end of the blink, the direction a5 of the sight line, the orientation a5 of the face, on the basis of image information, and then sequentially outputs the extracted biological information a1 to a5 as feature amounts $x_N$ (a1, a2, a3, a4, a5). This calculates the feature amounts $x_1$ (a1, a2, a3, a4, a5), $x_2$(a1, a2, a3, a4, a5), . . . , $x_N$ (a1, a2, a3, a4, a5) approximately every 10 seconds, which are outputted to the identifiers 32a, 32b, respectively. Hereinafter, for explanatory convenience, a feature amount $x_N$ (a1, a2, a3, a4, a5) is indicated by $x_N$. N is an integer greater than or equal to 1.

Figure 3:
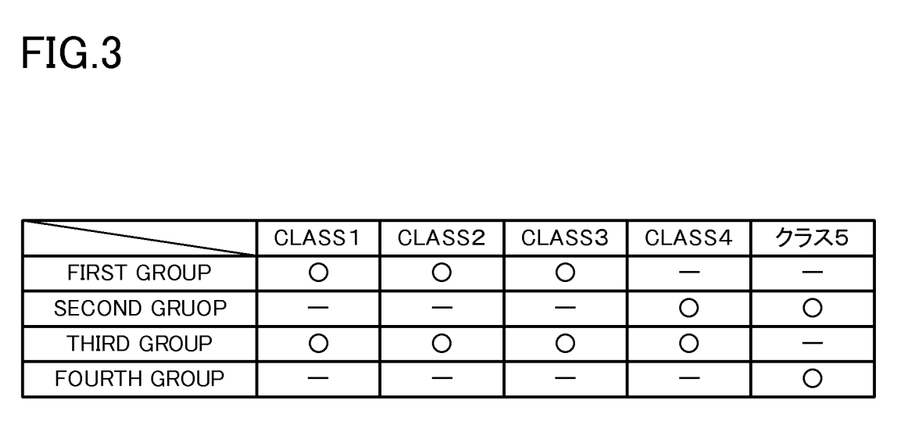
FIG. 3 is a table for explaining classes that belong to each group.

As illustrated in the table in FIG. 3, the present embodiment defines a first group composed of class 1, class 2 and class 3, a second group composed of class 4 and class 5, a third group composed of class 1, class 2, class 3 and class 4, and a fourth group composed of class 5. The state of the driver 60 is estimated on the basis of the result obtained in such a way that the identifiers 32a, 32b, which will be described later, identify a group to which the state of the driver 60 belongs.

The identifier 32a identifies whether the state of the driver 60 belongs to the first group composed of class 1, class 2 and class 3, or the second group composed of class 4 and class 5. The identifier 32a outputs an identification result $\alpha_N(x)$ to the estimate value calculator 33 if a feature amount $x_N$ is inputted. An AdaBoost-learned weak identifier, for example, can be used as the identifier 32a.

In the identification result $\alpha_N(x)$, a sign of $\alpha_N(x)$ indicates the group to which the state of the driver belongs. For example, if the sign of $\alpha_N(x)$ is −, the state of the driver belongs to the first group; and if the sign of $\alpha_N(x)$ is +, the state of the driver belongs to the second group.

In the identification result $\alpha_N(x)$, a magnitude of absolute value $|\alpha_N(x)|$ of $\alpha_N(x)$ indicates the reliability of the identification result. For example, if the sign of $\alpha_N(x)$ is −, a greater absolute value $|\alpha_N(x)|$ means that the determination is more reliable that the state of the driver belongs to the first group; and if the sign of $\alpha_N(x)$ is +, a greater absolute value $|\alpha_N(x)|$ means that the determination is more reliable that the state of the driver belongs to the second group.

The identifier 32b identifies whether the state of the driver belongs to the third group composed of class 1, class 2, class 3 and class 4 or the fourth group composed of class 5. The identifier 32b outputs an identification result $\beta_N(x)$ to the estimate value calculator 33 if a feature amount x is inputted. Similarly, an AdaBoost-learned weak identifier, for example, can be used as the identifier 32b.

In the identification result $\beta_N(x)$, a sign of $\beta_N(x)$ indicates the group to which the state of the driver belongs. For example, if the sign of $\beta_N(x)$ is −, the state of the driver belongs to the third group; and if the sign of $\beta_N(x)$ is +, the state of the driver belongs to the fourth group.

In the identification result $\beta_N(x)$, a magnitude of absolute value $|\beta_N(x)|$ of $\beta_N(x)$ indicates the reliability of the identification result. For example, if the sign of $\beta_N(x)$ is −, a greater absolute value $|\beta_N(x)|$ means that the determination is more reliable that the state of the driver belongs to the third group; and if the sign of $\beta_N(x)$ is +, a greater absolute value $|\beta_N(x)|$ means that the determination is more reliable that the state of the driver belongs to the fourth group.

The estimate value calculator 33 sequentially acquires an identification result $\alpha_N(x)$ outputted from the identifier 32a, and then uses four identification results $\alpha_N(x)$, $\alpha_{N-1}(x)$, $\alpha_{N-2}(x)$, $\alpha_{N-3}(x)$ including the latest identification result $\alpha_N(x)$ to perform an operation represented by the following expression (1). This calculates an average value $AVG\alpha_N$ of the four identification results $\alpha_N(x)$, $\alpha_{N-1}(x)$, $\alpha_{N-2}(x)$, $\alpha_{N-3}(x)$ outputted from the identifier 32a. Here, n is 4.

[Expression 1]

$$AVG\alpha_N = \frac{\sum_{i=0}^{n-1} \alpha_{N-i}(x)}{n} \quad (1)$$

Similarly, the estimate value calculator 33 sequentially acquires an identification result $\beta_N(x)$ outputted from the identifier 32b, and then uses four identification results $\beta_N(x)$, $\beta_{N-1}(x)$, $\beta_{N-2}(x)$, $\beta_{N-3}(x)$ including the latest identification result $\beta_N(x)$ to perform an operation represented by the following expression (2). This calculates an average value $AVG\beta_N$ of the four identification results $\beta_N(x)$, $\beta_{N-1}(x)$, $\beta_{N-2}(x)$, $\beta_{N-3}(x)$ outputted from the identifier 32b.

[Expression 2]

$$AVG\beta_N = \frac{\sum_{i=0}^{n-1} \beta_{N-i}(x)}{n} \quad (2)$$

Next, the estimate value calculator 33 performs operations represented by the following expressions (3) and (4) to calculate estimate values $D34_N$, $D45_N$.

[Expression 3]

$$D34_N = \text{sign}(AVG\alpha_N) \quad (3)$$

[Expression 4]

$$D45_N = \text{sign}(AVG\beta_N) \quad (4)$$

A sign(X) function contained in the above expressions (3) and (4) outputs 1 if the sign of X is +, outputs −1 if the sign of $AVG\alpha_N$ is −, and outputs 0 if X is 0. Values of estimation results $D34_N$, $D45_N$ represented by the above expression (1) is any one of 1, −1, 0, but in the present embodiment, it is rare that the variable of the sign function of the above expression (1) is 0. Accordingly, there is no problem in considering that values of estimation results $D34_N$, $D45_N$ are either 1 or −1.

The state estimator 34 estimates the state of the driver 60 on the basis of estimate values $D34_N$, $D45_N$ and average values $AVG\alpha_N$, $AVG\beta_N$.

As described above, in an identification result $\alpha_N(x)$, if the sign thereof is −, the state of the driver 60 belongs to the first group, and if the sign thereof is +, the state of the driver 60 belongs to the second group. Accordingly, in an estimate value $D34_N$ decided by the sign of an average value $AVG\alpha_N$ of identification results $\alpha_N(x)$, if the sign is −, the state of the driver 60 belongs to the first group, and if the sign is +, the state of the driver 60 belongs to the second group.

Similarly, in an identification result $\beta_N(x)$, if the sign thereof is −, the state of the driver 60 belongs to the third group, and if the sign thereof is +, the state of the driver 60 belongs to the fourth group. Accordingly, in an estimate value $D45_N$ decided by the sign of an average value $AVG\beta_N$ of identification results $\beta_N(x)$, if the sign thereof is −, the state of the driver 60 belongs to the third group, and if the sign thereof is +, the state of the driver 60 belongs to the fourth group.

Accordingly, when the estimate value $D34_N$ is −1 and the estimate value $D45_N$ is −1, it is determined that the state of the driver 60 belongs to the first and third groups. As seen from FIG. 3, the first group is composed of classes 1 to 3 and the third group is composed of classes 1 to 4. Then, the state estimator 34 estimates that if the estimate value $D34_N$ is −1 and the estimate value $D45_N$ is −1, the state of the driver 60 belongs to classes 1 to 3 that are common in the first and third groups.

If the estimate value $D34_N$ is −1 and the estimate value $D45_N$ is 1, it is determined that the state of the driver 60 belongs to the first and fourth groups. However, as seen from FIG. 3, there is no class common in the first and fourth groups. In this case, the state estimator 34 compares an absolute value $|AVG\alpha_N|$ of an average value $AVG\alpha_N$ and an absolute value $|AVG\beta_N|$ of an average value $AVG\beta_N$, and then estimates the group to which the state of the driver 60 belongs on the basis of the estimate value $D34_N$ or $D45_N$ specified by the signs of average values $AVG\alpha_N$ or $AVG\beta_N$ whose absolute value is greater.

For example, if the absolute value $|AVG\alpha_N|$ of the average value $AVG\alpha_N$ is greater than the absolute value $|AVG\beta_N|$ of the average value $AVG\beta_N$, the state estimator 34 estimates that the state of the driver 60 belongs to classes 1 to 3 that composes the first group, and if the absolute value $|AVG\beta_N|$ is greater than the absolute value $|AVG\alpha_N|$, the state estimator 34 estimates that the state of the driver 60 belongs to class 5 that composes the fourth group.

If the estimate value $D34_N$ is 1 and the estimate value $D45_N$ is −1, the state of the driver 60 is determined to belong to the second and third groups. As seen from FIG. 3, the second group is composed of classes 4 and 5 and the third group is composed of classes 1 to 4. Then, the state estimator 34 estimates that if the estimate value $D34_N$ is 1 and the estimate value $D45_N$ is −1, the state of the driver 60 belongs to class 4 that is in common with the second and third groups.

If the estimate value $D34_N$ is 1 and the estimate value $D45_N$ is 1, the state of the driver 60 is determined to belong to the second and fourth groups. As seen from FIG. 3, the second group is composed of classes 4 and 5, and the fourth group is composed of class 5. Then, the state estimator 34 estimates that if the estimate value $D34_N$ is 1 and the estimate value $D45_N$ is 1, the state of the driver 60 belongs to class 5 that is in common with the second and fourth groups.

The state estimator 34 performs the above estimation and outputs an estimation result $RST_N$ to the verifier 35.

The verifier 35 verifies an estimation result $RST_N$ of the state estimator 34. Specifically, the verifier 35 first performs an operation represented by the following expression (5) to calculate a verification value $CL_N$.

[Expression 5]

$$CL_N = \text{sign}(|AVG\alpha_N| + |AVG\beta_N| - 1) \qquad (5)$$

The estimation result outputter 36 determines, if the verification value $CL_N$ outputted from the verifier 35 is −1, that the reliability of the estimation result $RST_N$ estimated by the state estimator 34 is low, and outputs the estimation result $RST_{N-1}$, which was estimated before estimation of the estimation result $RST_N$, to an external device and/or the like.

Meanwhile, if the verification value $CL_N$ is 1, the estimation result outputter 36 compares the estimation result $RST_N$ estimated by the state estimator 34 and the estimation result $RST_{N-1}$ estimated before estimation of the estimation result $RST_N$. Then, if the estimation result outputter 36 determines that class to which the state of the driver 60 has transitioned continually, the estimation result outputter 36 outputs the estimation result $RST_N$ to an external device and/or the like. If as a result of comparison of the estimation result $RST_N$ and the estimation result $RST_{N-1}$ the estimation result outputter 36 does not determine that class to which the state of the driver 60 belongs has transitioned continually, the estimation result outputter 36 outputs the estimation result $RST_{N-1}$ to an external device and/or the like.

Specifically, in the present embodiment, there are cases in which the state of the driver 60 is estimated to belong to classes 1 to 3, classes 4 and 5, class 4, and class 5, respectively. Then, for example if the estimation result $RST_{N-1}$ indicates that the state of the driver 60 belongs to classes 1 to 3 and a subsequent estimation result $RST_N$ indicates that the state of the driver 60 belongs to class 4 or classes 1 to 3, the estimation result outputter 36 determines that the class to which the state of the driver 60 belongs has transitioned continually, and outputs the estimation result $RST_N$ to an external device and/or the like.

Meanwhile, for example, if the estimation result $RST_{N-1}$ indicates that the state of the driver 60 belongs to classes 1 to 3 and the subsequent estimation result $RST_N$ indicates that the state of the driver 60 belongs to class 5, the estimation result outputter 36 does not determine that the state of the driver 60 has not transitioned continually, and outputs the estimation result $RST_{N-1}$ to an external device and/or the like.

This enables an external device and/or the like to output to the driver 60 an alarm for preventing drowsy driving and/or an announcement to urge the driver 60 to take a rest, for example, on the basis of the estimation result.

As described above, in the present embodiment, estimate values D34, D45 are calculated on the basis of an average value of a plurality of identification results α(x) and an average value of a plurality of identification results β(x). Then, on the basis of the estimate values D34, D45, the class to which the state of the driver 60 belongs is estimated. Therefore, when identification results α(x), β(x) are sequentially calculated, it is possible to accurately estimate the class to which the driver 60 belongs even if an identification result having much error is outputted.

In the present embodiment, by performing an operation represented by the above expression (5), a verification value CL is calculated. Then, on the basis of the verification value CL, the estimation result RST is corrected. Specifically, if the reliability of the estimation result $RST_N$ is determined to be low on the basis of the verification value CL, the estimation result $RST_{N-1}$ that was estimated the previous time is outputted as an estimation result RST. This allows for output of a highly reliable estimation result.

In the present embodiment, the estimation result $RST_N$ and the estimation result $RST_{N-1}$ are compared and if it is determined that class to which the driver 60 belongs has transitioned continually, the estimation result $RST_N$ is outputted. Meanwhile, the estimation result $RST_N$ and the estimation result $RST_{N-1}$ are compared and if it is not determined that class to which the driver 60 belongs has transitioned continually, the previous estimation result $RST_{N-1}$ is outputted. Therefore, a highly reliable estimation result is able to be outputted.

Specifically, it is considered that a rapid change of the state of the driver is rare and at least 45 seconds is required from when the state of the driver has transitioned to a certain class until when the state of the driver transitions to the subsequent class. Therefore, like the present embodiment, if the class to which the state of the driver belongs is sequentially estimated on the basis of four identification results $\alpha_N(x)$, $\alpha_{N-1}(x)$, $\alpha_{N-2}(x)$, $\alpha_{N-3}(x)$ and four identification results $\beta_N(x)$, $\beta_{N-1}(x)$, $\beta_{N-2}(x)$, $\beta_{N-3}(x)$ sampled for forty seconds, the class to which the state of the driver is estimated to belong should transition continuously.

For example, if the estimation result $RST_{N-1}$ indicates that the state of the driver 60 belongs to classes 1 to 3, a subsequent estimation result $RST_N$ is considered to indicate that the state of the driver 60 belongs to class 4 or that the state of the driver 60 belongs to classes 1 to 3. Meanwhile, if the estimation result $RST_{N-1}$ indicates that the state of the driver 60 belongs to classes 1 to 3, a subsequent estimation result $RST_N$ is unlikely to indicate the state of the driver 60 belongs to class 5. Therefore, by outputting only an estimation result that has continuity from the latest estimation result, a highly reliable estimation result is able to be outputted.

Second Embodiment

Next, a second embodiment of the present invention will be described with reference to drawings. The same or equivalent configurations as those of the first embodiment have the same reference signs and description of those reference signs will be omitted or simplified.

A state estimation system 10 according to the present embodiment is different from the state estimation system 10 according to the first embodiment in that an estimation device 30 is realized by a common computer, microcomputer or the like.

Figure 4:
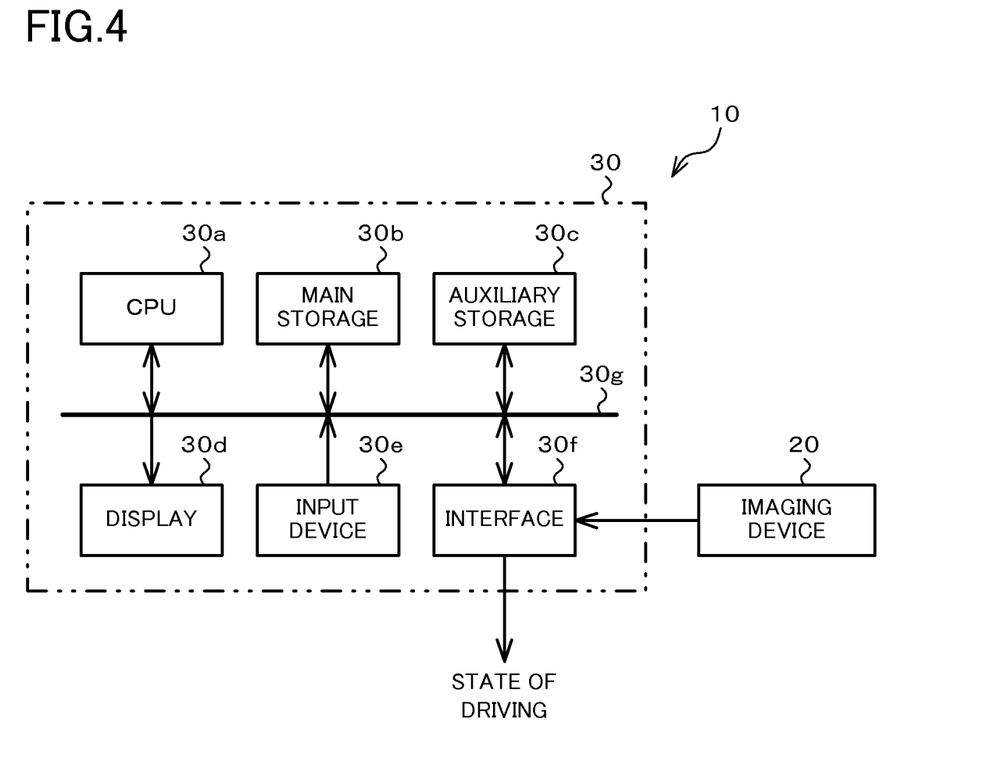
FIG. 4 is a block diagram illustrating a state estimation system according to a second embodiment.

FIG. 4 is a block diagram illustrating physical configuration of the state estimation system 10. As illustrated in FIG. 4, the state estimation system 10 includes the imaging device 20, and the estimation device 30 composed of a computer.

The estimation device 30 includes a CPU (Central Processing Unit) 30a, a main storage 30b, an auxiliary storage 30c, a display 30d, an input device 30e, an interface 30f and a system bus 30g that connects the above components to each other.

The CPU 30a performs after-mentioned processing according to a program stored in the auxiliary storage 30c.

The main storage 30b includes a RAM (Random Access Memory) and the like and is used as a work area of the CPU 30a.

The auxiliary storage 30c includes a non-volatile memory such as a ROM (Read Only Memory), a magnetic disk and a semiconductor memory. The auxiliary storage 30c has stored a program to be executed by the CPU 30a and various parameters, and also sequentially stores image information outputted from the imaging device 20 and the result of processing by the CPU 30a.

The display 30d includes, for example, an LCD (Liquid Crystal Display), and displays the result of processing by the CPU 30a.

The input device 30e includes input keys and a pointing device. An instruction from an operator is inputted via the input device 30e and is outputted via the system bus 30g to the CPU 30a.

The interface 30f includes a serial interface, a LAN (Local Area Network) interface and/or the like. The imaging device 20 is connected via the interface 30f to the system bus 30g.

Figure 5:
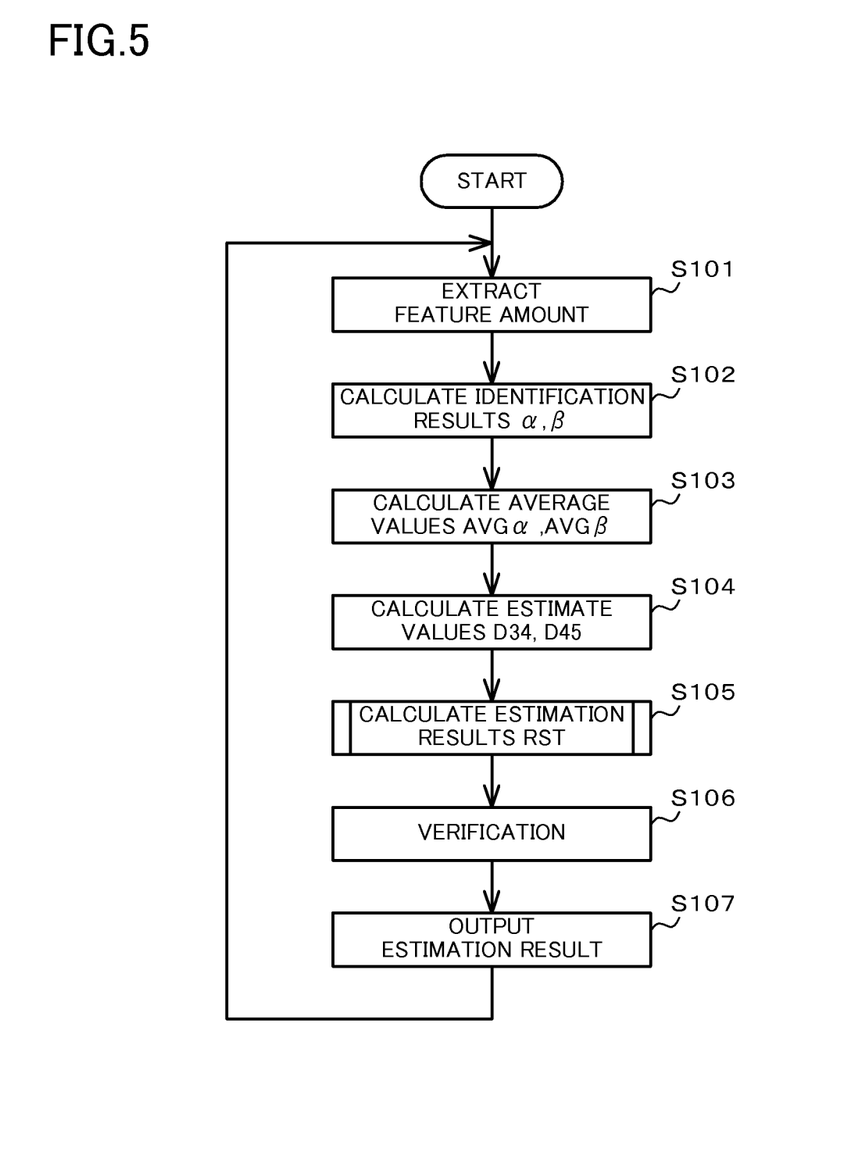
FIG. 5 is a flow chart for explaining operation of an estimation device.

The flow chart in FIG. 5 illustrates a series of processing algorithm of a program to be executed by the CPU 30a. Hereinafter, processing to be performed by the estimation device 30 will be described with reference to FIG. 5. This processing is performed by the CPU 30a after image information is outputted from the imaging device 20.

At step S101, the CPU 30a extracts biological information of the driver 60 as a feature amount $x_N$ from image information outputted from the imaging device 20, for example, every 10 seconds.

At the subsequent step S102, the CPU 30a identifies whether the state of the driver 60 belongs to the first group composed of class 1, class 2 and class 3 or the second group composed of class 4 and class 5 on the basis of the feature amount $x_N$, and then calculates an identification result $\alpha_N(x)$.

Similarly, the CPU 30a identifies whether the state of the driver belongs to the third group composed of class 1, class 2, class 3 and class 4 or the fourth group composed of class 5 on the basis of the feature amount $x_N$, and then calculates an identification result $\beta_N(x)$.

At the subsequent step S103, the CPU 30a uses four identification results $\alpha_N(x)$, $\alpha_{N-1}(x)$, $\alpha_{N-2}(x)$, $\alpha_{N-3}(x)$ including the latest identification result $\alpha_N(x)$ to perform an operation represented by the above expression (1), thereby calculating an average value $AVG\alpha_N$, and uses four identification results $\beta_N(x)$, $\beta_{N-1}(x)$, $\beta_{N-2}(x)$, $\beta_{N-3}(x)$ including the latest identification result $\beta_N(x)$ to perform an operation represented by the above expression (2), thereby calculating an average value $AVG\beta_N$.

At the subsequent step S104, the CPU 30a performs operations represented by the above expressions (3) and (4) to calculate estimate values $D34_N$, $D45_N$.

Figure 6:
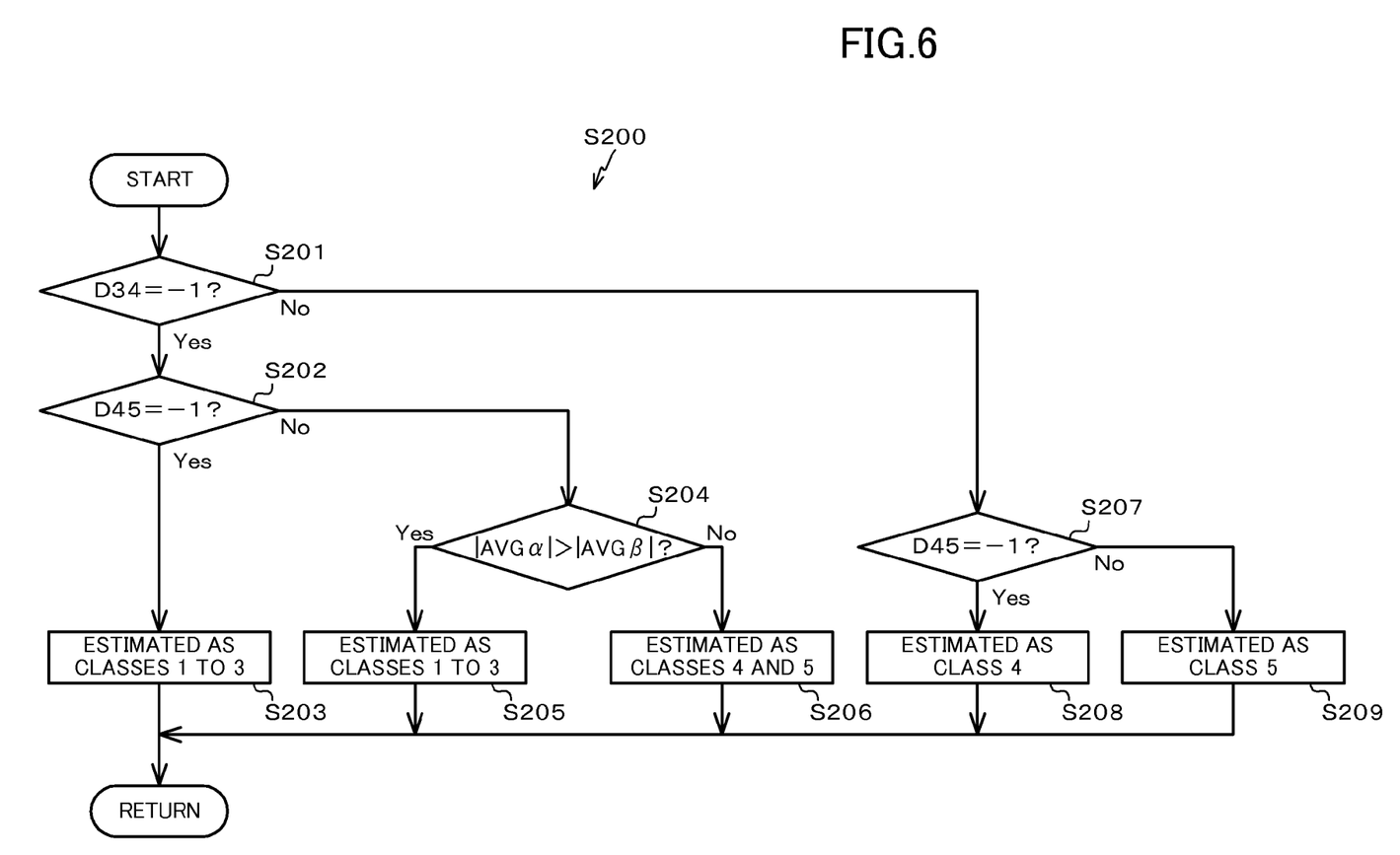
FIG. 6 is a flow chart for explaining operation of an estimation device.

At the subsequent step S105, the CPU 30a performs processing illustrated in the flow chart in FIG. 6 for calculating an estimation result RST.

At the first step S201, the CPU 30a determines whether the estimate value $D34_N$ is −1. If the estimate value $D34_N$ is −1 (step S201: Yes), the CPU 30a proceeds to step S202.

At step S202, the CPU 30a determines whether the estimate value $D45_N$ is −1. If the estimate value $D45_N$ is −1 (step S202: Yes), the CPU 30a proceeds to step S203 and estimates that the state of the driver 60 belongs to any one of classes 1 to 3.

At step S202, if the estimate value $D45_N$ is 1 (step S202: No), the CPU 30a proceeds to step S204.

At the subsequent step S204, the CPU 30a compares the absolute value $|AVG\alpha_N|$ of the average value $AVG\alpha_N$ and the absolute value $|AVG\beta_N|$ of the average value $AVG\beta_N$. If the CPU 30a determines that the absolute value $|AVG\alpha_N|$ is greater (step S204: Yes), the CPU 30a proceeds to step S205 and estimates that the state of the driver 60 belongs to any one of classes 1 to 3. Meanwhile, if the CPU30a determines that the absolute value $|AVG\alpha_N|$ is smaller (step S204: No), the CPU 30a proceeds to step S206 and estimates that the state of the driver 60 belongs to any one of classes 4 and 5.

At step S201, if the estimate value $D34_N$ is 1 (step S201: No), the CPU 30a proceeds to step S207.

At step S207, the CPU 30a determines whether the estimate value $D45_N$ is −1. If the estimate value $D45_N$ is −1 (step S207: Yes), the CPU 30a proceeds to step S208 and estimates that the state of the driver 60 belongs to class 4. Meanwhile, if the estimate value $D45_N$ is 1 (step S207: No), the CPU 30a proceeds to step S209 and estimates that the state of the driver 60 belongs to class 5.

When processing at steps S203, S205, S206, S208 and S209 are completed, the CPU 30a proceeds to step S106.

At the subsequent step S106, the CPU 30a verifies the estimation result RST. Specifically, the CPU 30a performs an operation represented by the following expression (5) to calculate a verification value $CL_N$.

At the subsequent step S107, if the verification value $CL_N$ is −1, the CPU 30a determines that the reliability of the estimation result $RST_N$ is low, and outputs the estimation result $RST_{N-1}$, estimated before estimation of the estimation result $RST_N$, to an external device and/or the like.

Meanwhile, if the verification value $CL_N$ is 1, the CPU 30a compares the estimation result $RST_N$ and the estimation result $RST_{N-1}$ estimated before estimation of the estimation result $RST_N$. Then, if the CPU 30a determines that the class to which the state of the driver 60 belongs has transitioned continually, the CPU 30a outputs the estimation result $RST_N$ to an external device and/or the like. If the CPU 30a compares the estimation result $RST_N$ and the estimation result $RST_{N-1}$ and does not determine that the class to which the state of the driver 60 belongs has transitioned continually, the CPU 301 outputs the previous estimation result $RST_{N-1}$ to an external device and/or the like.

As described above, in the present embodiment, estimate values D34, D45 are calculated on the basis of average values of a plurality of identification results $\alpha(x)$ and a plurality of identification results $\beta(x)$. Then, the class to which the state of the driver 60 belongs is estimated on the basis of the estimate values D34, D45. Therefore, in sequential calculation of identification results $\alpha(x)$, $\beta(x)$, even if an identification result having much error is outputted, the class to which the state of the driver 60 belongs is able to be accurately estimated.

In the present embodiment, by performing an operation represented by the above expression (5), a verification value CL is calculated. Then, the estimation result RST is corrected on the basis of the verification value CL. Specifically, if it is determined that the reliability of the estimation result $RST_N$ is low on the basis of the verification value CL, the estimation result $RST_{N-1}$ estimated the previous time is outputted as an estimation result RST. This allows for output of a highly reliable estimation result.

In the present embodiment, the estimation result $RST_N$ and the estimation result $RST_{N-1}$ are compared, and if it is determined that the class to which the state of the driver 60 belongs has transitioned continually, the estimation result $RST_N$ is outputted to an external device and/or the like. Meanwhile, the estimation result $RST_N$ and the estimation result $RST_{N-1}$ are compared and if it is not determined that the class to which the state of the driver 60 has transitioned continually, the previous estimation result $RST_{N-1}$ is outputted to an external device and/or the like. Therefore, a highly reliable estimation result is able to be outputted.

Embodiments of the present invention have been described, but the present invention is not limited to the above embodiments. For example, in the above embodiments, a case has been described in which a feature amount $x_N$ is outputted every 10 seconds. The present invention is not limited to this, but a feature amount $x_N$ may be outputted every 10 seconds or less.

In the above embodiments, a case has been described in which a feature amount is extracted from an image of the face of the driver 60. The present invention is not limited to this, but biological information, such as the pulse rate and breathing interval of the driver may be used as a feature amount. As a feature amount, an acceleration in a direction orthogonal to the travelling direction of a vehicle and/or the like may be used.

In the above embodiments, a verification value CL is calculated on the basis of the expression (5). This expression (5) is one example, and a general expression for calculating a verification value CL is represented by, for example, the following expression (6). k is a constant.

[Expression 6]

$$CL_N = \mathrm{sign}(|AVG\alpha_N| + |AVG\beta_N| - k) \quad (6)$$

In the above embodiments, a case has been described in which the estimation device 30 has two identifiers 32a, 32b. The present invention is not limited to this, but the estimation device 30 may include more than or equal to three identifiers.

Function of the estimation device 30 according to each of the above embodiments is able to be realized by a dedicated hardware or a common computer system.

In the second embodiment, a program stored in the auxiliary storage 30c of the estimation device 30 may be stored and distributed in a computer-readable recording medium such as a flexible disk, a CD-ROM (Compact Disk Read-Only Memory), a DVD (Digital Versatile Disk), a MO (Magneto-Optical disk), and by installing the program to a computer, a device to perform the above processing may be configured.

A program may be stored in a disk device or the like that a predetermined server device on a communication network such as the Internet has, and may be downloaded to a computer, for example, by being superimposed on a carrier wave.

A program may be started and executed while being transferred via a communication network.

All or part of a program may be executed on a server device, and the above image processing may be performed while information on the processing being transmitted and received via a communication network.

If part of the above function is realized by an OS (Operating System) or if the above function is realized by an OS and an application, only the part other than the OS may be stored and distributed in a medium and downloaded to a computer.

Various embodiments and variations of the present invention are possible without departing from the extensive spirit and scope of the present invention. The above embodiments are for explaining the present invention, not for limiting the scope of the present invention.

This application is based on Japanese Patent Application No. 2011-47028 filed on Mar. 3, 2011. The entire specification, claims and drawings of Japanese Patent Application No. 2011-47028 shall be incorporated herein by reference.

INDUSTRIAL APPLICABILITY

A driver's state estimation device, a state estimation method and a program according to the present invention are suitable for estimating the state of the driver.

REFERENCE SIGNS LIST

10 State estimation system
20 Imaging device
30 Estimation device
30a CPU
30b Main storage
30c Auxiliary storage
30d Display
30e Input device
30f Interface
30g System bus
31 Feature amount outputter
32a Identifier
32b Identifier
33 Estimate value calculator
34 State estimator
35 Verifier
36 Estimation result outputter
60 Driver
61 Seat
α, β Identification results
D34, D45N Estimation results
RST Estimation result

The invention claimed is:

1. A state estimation device to estimate the state of a driver, the state estimation device comprising:
   first identificator to identify, of a first group and a second group, the group the state of the driver belongs to using a feature amount about the driver as an input value, each of the first group and the second group having a plurality of classes defined as based on a degree of the activity of the driver;
   second identificator to identify, of a third group and a forth group, the group the state of the driver belongs to using a feature amount about the driver as an input value, each of the third group and the fourth group having a plurality of classes defined as based on a degree of the activity of the driver;
   estimator to estimate the class to which the state of the driver belongs on the basis of the identification result of the first identificator and the identification result of the second identificator;
   verifier to verify an estimation result of the estimator; and
   outputter to output an estimation result that corresponds to a verification result of the verifier,
   wherein the plurality of classes correspond to different degrees of sleepiness or alertness of the driver.

2. The state estimation device according to claim 1, wherein
   the verifier
   performs an operation represented by the following expression where the absolute value of the identification result of the first identificator is A, the absolute value of the identification result of the second identificator is B, and the constant is k thereby to calculate the verification value CL; and
   the outputter outputs an estimation result corresponding to the verification value CL

[Expression 1]

$$CL = \mathrm{sign}(A + B - k).$$

3. The state estimation device according to claim 1, wherein the output result of the first identificator is the average value of output values of the first identificator, the output result of the second identificator is the average value of output values of the second identificator.

4. The state estimation device according to claim 3, wherein the output result of the first identificator and the output result of the second identificator both are average values of output values outputted for 45 seconds.

5. The state estimation device according to claim 1, wherein if the class indicated by the first estimation result and the class indicated by the second estimation result outputted before the first estimation result are not continuous, the outputter outputs the second estimation result.

6. The state estimation device according to claim 1, wherein the first identificator and the second identificator are AdaBoost-learned identificators.

7. A state estimation method to estimate the state of a driver, the state estimation method comprising:
- a first identification step to identify, of a first group and a second group, the group to which the state of the driver belongs using a feature amount about the driver as an input value, each of the first group and the second group having a plurality of classes defined as based on a degree of the activity of the driver;
- a second identification step to identify, of a third group and a fourth group, the group to which the state of the driver belongs using a feature amount about the driver as an input value, each of the third group and the fourth group having a plurality of classes defined as based on a degree of the activity of the driver;
- an estimation step to estimate the class to which the state of the driver belongs on the basis of the identification result at the first identification step and the identification result at the second identification step;
- a verification step to verify a result of the estimation; and
- an output step to output an estimation result corresponding to the result of the verification,
- wherein the plurality of classes correspond to different degrees of sleepiness or alertness of the driver.

8. A non-transitory recording medium on which recorded a program causing a computer to perform:
- a first identification procedure to identify, of a first group and a second group, the group to which the state of the driver belongs using a feature amount about the driver as an input value, each of the first group and the second group having a plurality of classes defined as based on a degree of the activity of the driver;
- a second identification procedure to identify, of a third group and a fourth group, the group to which the state of the driver belongs using a feature amount about the driver as an input value, each of the third group and the fourth group having a plurality of classes defined as based on a degree of the activity of the driver;
- an estimation procedure to estimate the class to which the driver belongs on the basis of the identification result of the first identification procedure and the identification result of the second identification procedure;
- a verification procedure to verify the result of the estimation; and
- an output procedure to output the estimation result corresponding to the result of the verification,
- wherein the plurality of classes correspond to different degrees of sleepiness or alertness of the driver.

* * * * *